(12) United States Patent
Kato (10) Patent No.: US 8,199,207 B2
(45) Date of Patent: Jun. 12, 2012

(54) IMAGE RECORDING APPARATUS, IMAGE TILT CORRECTION METHOD, AND RECORDING MEDIUM STORING IMAGE TILT CORRECTION PROGRAM

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 154 days.

(21) Appl. No.: 12/731,227

(22) Filed: Mar. 25, 2010

(65) Prior Publication Data

US 2010/0245601 A1    Sep. 30, 2010

(30) Foreign Application Priority Data

Mar. 27, 2009  (JP) .................................. 2009-079379

(51) Int. Cl.
*H04N 5/228* (2006.01)
*H04N 5/225* (2006.01)
*G03B 17/00* (2006.01)
*G02B 27/64* (2006.01)

(52) U.S. Cl. ............. 348/208.99; 348/208.1; 348/219.1; 396/52; 359/554

(58) Field of Classification Search ............. 348/208.99, 348/208.1, 219.1; 396/52–55; 359/554–557
See application file for complete search history.

(56) References Cited

U.S. PATENT DOCUMENTS

2005/0168583 A1* 8/2005 Thomason ................. 348/208.4
2009/0244308 A1   10/2009 Mori

FOREIGN PATENT DOCUMENTS

| JP | 2006-211378 A | 8/2006 |
| JP | 2006-245726 A | 9/2006 |
| JP | 2008-271056 A | 11/2008 |
| WO | WO 2007/132679 A1 | 11/2007 |

* cited by examiner

*Primary Examiner* — Lin Ye
*Assistant Examiner* — Mekonnen Dagnew
(74) *Attorney, Agent, or Firm* — Holtz, Holtz, Goodman & Chick, PC (57) ABSTRACT

An image recording device includes an obtaining module configured to obtain tilt information indicating a tilt direction and a tilt angle of an image with respect to a horizontal direction for a processing unit including frames, a rotational processing module configured to perform, in accordance with the tilt direction and the tilt angle indicated by the tilt information, a rotational process having a same rotational direction and a same rotational amount for correction of tilting with respect to images of the frames, and a storing module configured to store the images of the frames subjected to the rotational process.

12 Claims, 6 Drawing Sheets

IMAGE RECORDING APPARATUS, IMAGE TILT CORRECTION METHOD, AND RECORDING MEDIUM STORING IMAGE TILT CORRECTION PROGRAM

CROSS-REFERENCE TO RELATED APPLICATIONS

This application is based upon and claims the benefit of priority from prior Japanese Patent Application No. 2009-079379, filed Mar. 27, 2009, the entire contents of which are incorporated herein by reference.

BACKGROUND OF THE INVENTION

1. Field of the Invention

The present invention relates to an image recording apparatus, a method for correcting an image tilt, and a recording medium storing an image tilt correction program.

2. Description of the Related Art

In conventional technologies, image-capturing devices such as digital cameras are designed to correct tilting of the devices themselves (Jpn. Pat. Appln. KOKAI Publication No. 2008-271056, for example). In such devices, images are periodically captured and displayed on a monitor as live view images before an image is captured for recording. During the image capturing for the live view display, the rotational angle of each of sequentially captured images with respect to the horizontal position (tilt angle of the main body of the device with respect to the horizontal direction) is detected, and the live view image is automatically corrected by rotating it to the horizontal position in accordance with the detected angle. Then, a center region having a predetermined size and aspect ratio is cut out of the corrected image, and the cutout image is displayed on the monitor. Technologies of correcting the image for recording by performing rotational correction and image cutout in the same manner and recording the cutout image are also known. According to such technologies, when the digital camera or the like is unintentionally tilted when capturing an image, a still image suitably keeping a horizontal position can be recorded.

As described above, the live view images that are sequentially displayed on the monitor before recording the image form a video image. The above technologies therefore can be applied not only to a still-image recording but also to a video-image recording. In other words, if frame images captured during video-image recording (capturing) are individually subjected to the rotational correction and image cutout and the cutout images are recorded as frame images, the horizontal position can be maintained for the entire image-capturing period, and easily viewable high-quality video images can be recorded.

In such a situation, however, because the horizontal position of the picture is completely fixed, the recording video image lacks realism, looking as if it is automatically captured. For this reason, the recording a video image may not come out as the user desires, depending on the image-capturing occasion. For example, for a video image captured at a party held among close friends, the user may prefer video image depicting the feel of the surroundings including the movement of the user, to pictures that are easy to view at the time of replaying. The conventional technologies, however, cannot respond to such a need in video capturing.

BRIEF SUMMARY OF THE INVENTION

The purpose of the present invention is to provide an image recording device, an image tilt correction method, and a recording medium storing an image tilt correction program, with which an easily viewable a high-quality video image that ensures realism can be recorded.

According to an embodiment of the present invention, an image recording device comprises:

an obtaining module configured to obtain tilt information indicating a tilt direction and a tilt angle of an image with respect to a horizontal direction for a processing unit including frames;

a rotational processing module configured to perform, in accordance with the tilt direction and the tilt angle indicated by the tilt information obtained by the obtaining module, a rotational process having a same rotational direction and a same rotational amount for correction of tilting with respect to images of the frames; and a storing module configured to store the images of the frames subjected to the rotational process by the rotational processing module.

According to another embodiment of the present invention, an image tilt correcting method comprises:

obtaining tilt information indicating a tilt direction and a tilt angle of an image with respect to a horizontal direction for a processing unit including frames;

performing, in accordance with the tilt direction and the tilt angle indicated by the tilt information, a rotational process having a same rotational direction and a same rotational amount for correction of tilting with respect to images of the frames; and storing the images of the frames subjected to the rotational process.

According to another embodiment of the present invention, a computer readable medium having stored thereon a computer program which is executable by a computer, the computer program controlling the computer to execute functions of:

obtaining tilt information indicating a tilt direction and a tilt angle of an image with respect to a horizontal direction for a processing unit including frames;

performing, in accordance with the tilt direction and the tilt angle indicated by the tilt information, a rotational process having a same rotational direction and a same rotational amount for correction of tilting with respect to images of the frames; and storing the images of the frames subjected to the rotational process.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

An embodiment of an image recording apparatus, an image tilt correction method, and a recording medium storing an image tilt correction program according to the present invention will now be described with reference to the accompanying drawings.

Figure 1:
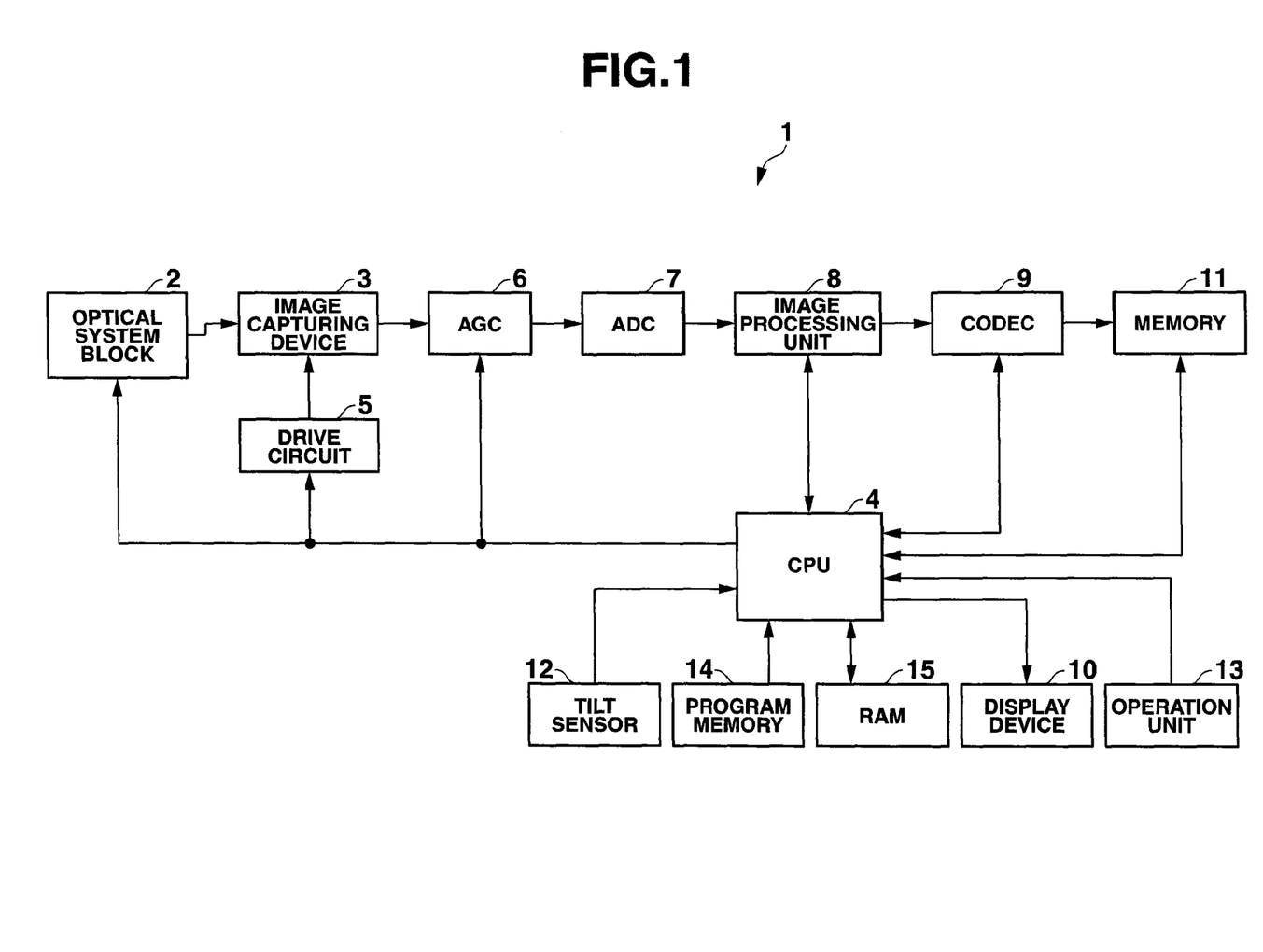
FIG. 1 is a block diagram of a digital camera according to an embodiment of the present invention.

The embodiments of the present invention will be discussed below. FIG. 1 is a block diagram schematically showing the structure of a digital camera 1, which is the image recording device according to the embodiment of the present invention. This digital camera 1 is provided with still-image and video-image capturing functions, and mainly comprises the following components.

The digital camera 1 comprises an optical system block 2 and an image capturing device 3 having a light reception surface on which an optical image of a subject is formed by way of the optical system block 2. The optical system block 2 comprises a lens group including a zoom lens and a focus lens, a lens diaphragm, a lens motor that drives the lens group, and an actuator that opens and closes the diaphragm. By a CPU 4 controlling the lens motor and the actuator, the zoom factor, the focal position, and the amount of light received by the image capturing device 3 are controlled.

The image capturing device 3 is a CCD image sensor or a CMOS image sensor, and driven by a drive circuit 5 at a predetermined output frame rate so as to perform photoelectric conversion onto the optical image of the subject and output an image signal corresponding to the optical image to an automatic gain controller (AGC) 6. The AGC 6 adjusts the gain of the input image signal in accordance with the instruction of the CPU 4 and outputs it to an analog-to-digital converter (ADC) 7. The ADC 7 converts the input image signal to digital image data, and outputs it to an image processing unit 8.

The image processing unit 8 includes a buffer memory for temporarily storing image data that is sequentially input, and performs various image processing such as gamma correction on the gain-adjusted image data, white balance adjustment in accordance with the type of a light source, generation of R, G, and B color component data for each pixel, and YUV conversion for generating YUV data from the generated RGB data. Then, the image processing unit 8 outputs the YUV data generated for each frame to the CPU 4 and the coder/decoder (CODEC) 9.

The YUV data received by the CPU 4 is converted to a video signal at a display device 10 that comprises a liquid crystal monitor and a drive circuit for the monitor, and displayed as a live view image.

The CODEC 9 is a coding means of the present invention for executing JPEG coding/decoding of still images and MPEG coding/decoding of video images. For coding/decoding of still images and video images, the CODEC 9 mainly comprises an orthogonal transformation circuit, a quantization circuit, a motion detection circuit, a forward direction prediction circuit, a coding circuit, a decoding circuit, an inverse orthogonal transformation circuit, a frame memory and the like, although these are not shown in the drawings.

The YUV data generated for one frame by the image processing unit 8 at the time of capturing a still image is compressed and coded in JPEG format by the CODEC 9. After various kinds of image-capturing information such as date information and the image size is attached by the CPU 4, this YUV data is stored as still image data (in a still image file) in a memory 11. The memory 11 is a storage means of the present invention, and may be a flash memory contained in the camera main body or a memory card of any kind that can be inserted to and ejected from the camera main body.

The YUV data generated by the image processing unit 8 at the video capturing (recording) time is sent frame by frame directly to the CODEC 9, or is first sent frame by frame to the CPU 4, where it is subjected to a rotational process and a trimming process that will be explained later, and then sent to the CODEC 9.

The YUV data of each frame is sequentially compressed and coded in MPEG format by the CODEC 9 into three different kinds of pictures; an I picture (intra-coded picture) obtained by coding (intra-coding) the frame information only without using intra-frame prediction, and a P picture (predictive-coded picture) and a B picture (bi-directionally predictive coded picture) that are obtained by coding the data by using images of other frames as reference images.

At the time of replaying, the still image data and video data stored in the memory 11 are read from the CPU 4 and sent to the CODEC 9, where they are decoded. Then, the data are sent to the display device 10, and replayed as a still image or a video image.

A tilt sensor 12, an operation unit 13, a program memory 14 and a RAM 15 are connected to the CPU 4. The operation unit 13 contains different buttons such as a power switch, a mode switching button for switching between an image recording mode, which is the standard operation mode of the digital camera 1, and a replay mode for displaying recorded images, a menu button and a shutter button. The operation state of each button is scanned by the CPU 4 as needed. The RAM 15 is a working memory of the CPU 4.

The tilt sensor 12 is an acceleration sensor that detects the acceleration due to gravity in the horizontal direction. The tilt sensor 12 is arranged in the main body (not-shown) of the digital camera 1 in such a manner that the detected acceleration due to gravity in the horizontal direction becomes 0 when the captured image is kept horizontal, or in other words when it is not rotated with respect to the image-capturing optical axis (optical axis of the optical system block 2).

The tilt sensor 12 functions as an obtaining means of the present invention. If the camera main body is tilted to the right (in a clockwise direction) when viewed from the front of the camera main body, the tilt sensor 12 detects a positive value as the acceleration due to gravity. The tilt sensor 12 detects a negative value as the acceleration due to gravity if the camera main body is tilted to the left (in a counterclockwise direction). The tilt sensor 12 outputs this value to the CPU 4 as tilt information indicating the tilt angle (rotational angle with respect to the image-capturing optical axis) and the tilt direction of the camera main body (or field of view) with respect to the horizontal direction.

In the program memory 14, control programs necessary for the CPU 4 to control the above units, especially the program according to the present invention, and various kinds of data that the CPU 4 uses in AE control and AF control are stored. In accordance with the above control program, the CPU 4 executes the following processes by using the RAM 15 as a working memory so as to function as the rotational processing means, the change amount limiting means, the maximum correction amount limiting means and the rotation termination means of the present invention.

The program memory 14 is a nonvolatile memory in which recorded data can be rewritten. In addition to the aforementioned programs and data, various kinds of setting information for various functions of the digital camera 1 that can be updated by the user as needed or automatically updated is stored therein.

Figure 2:
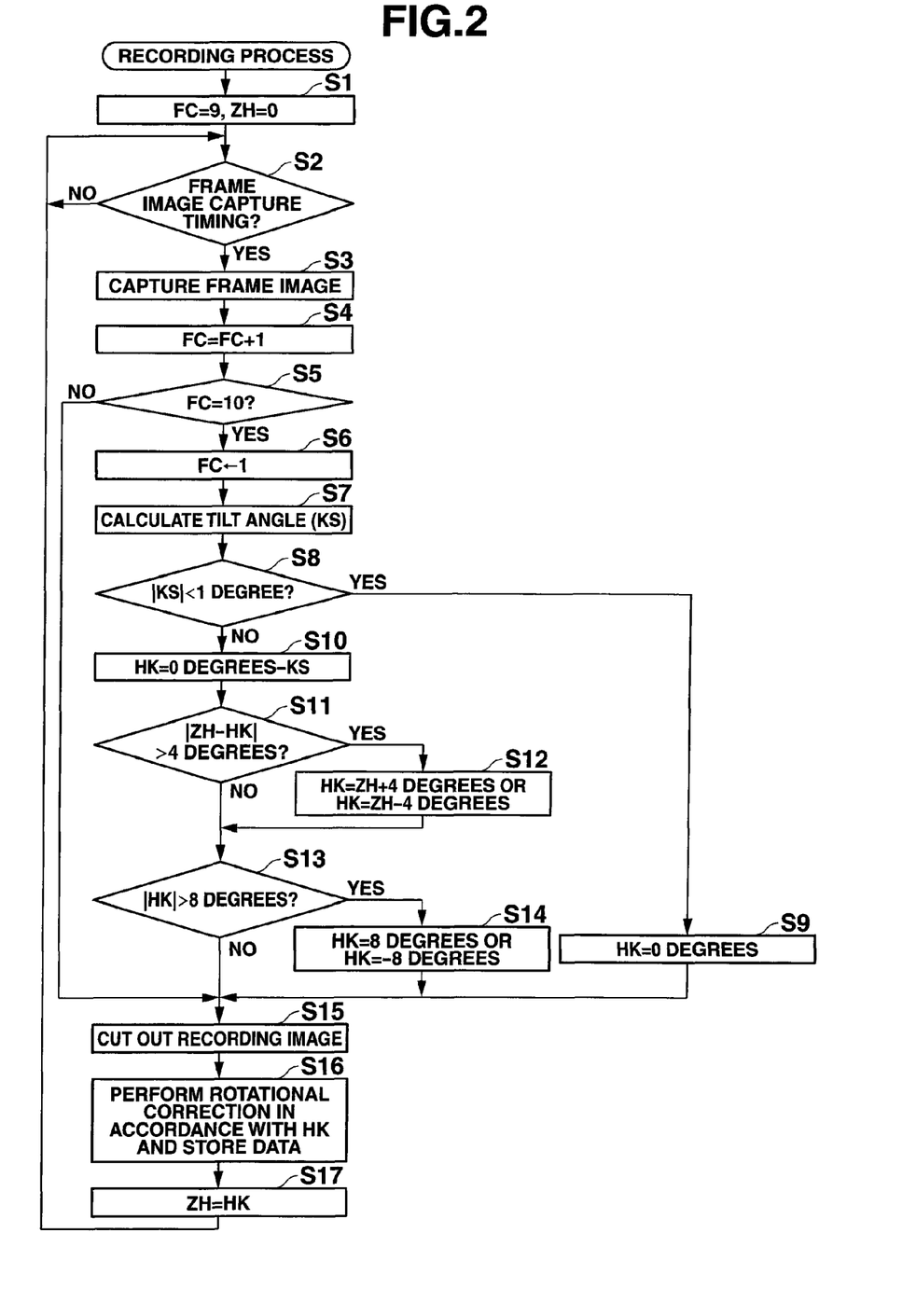
FIG. 2 is a flowchart showing the procedure of an image recording process conducted by the CPU.
Figures 3A, 3B:
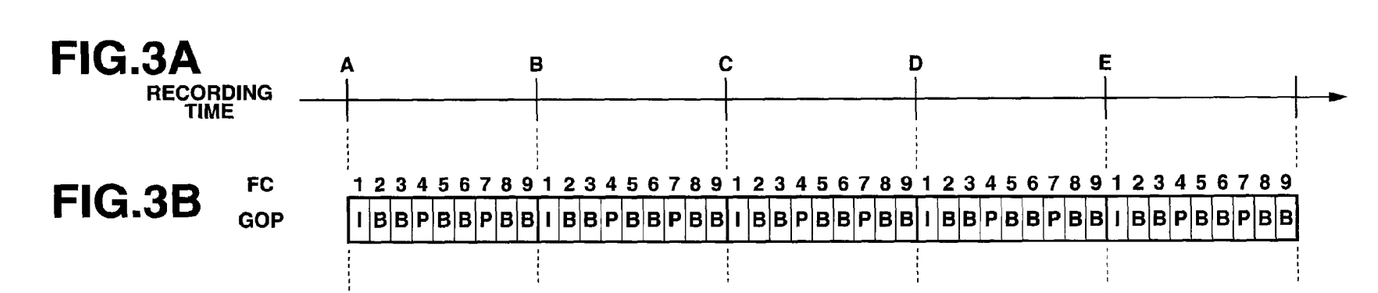
FIGS. 3A, 3B, 3C, and 3D show timing charts of the recording process.

The operation of the digital camera 1 having the above structure with a video recording mode selected as an operation mode is now explained. FIG. 2 is a flowchart showing the procedure of the recording process executed by the CPU 4 in the recording mode, and FIGS. 3A, 3B, 3C, and 3D show timing charts of this recording process. In the following explanation, it is assumed for the sake of convenience that, in a video file (MPEG file) stored in the recording mode, a Group Of Picture (GOP), which is the minimum unit for random access at the video replaying time, comprises pictures equivalent to nine frames (I picture, P pictures and B pictures), as illustrated in FIG. 3B.

First, an overview of the recording process will be provided. In the recording process according to the present embodiment, the tilt angle of the digital camera 1 with respect to the horizontal direction (hereinafter, simply referred to as tilt angle) is detected at the frame image capturing timing for the leading frame of every GOP. Then, a rotational process is performed on all the frame images of the same GOP by using the same correction angle corresponding to the detected tilt angle (tilt detection angle). The corrected frame images are coded and recorded as video data, which is any one of an I picture, a P picture and a B picture.

When the tilt angle of the digital camera 1 with respect to the horizontal direction is smaller than a predetermined minimum correction angle, the rotational process is not conducted. Furthermore, the maximum rotational amount (correction amount) in one rotational process is limited to a predetermined maximum correction amount. Moreover, a change in the rotational amount (correction amount) between any two adjacent GOPs is limited to the maximum change amount. According to the present embodiment, the minimum correction angle is 1 degree, the maximum correction amount is 8 degrees, and the maximum change amount is 4 degrees.

The specific procedure of the recording process will be explained below with reference to FIG. 2. That is, in the digital camera 1 that is set to the recording mode, when the shutter button is pressed, the CPU 4 initiates the recording process and initializes predetermined parametric values that are to be used in the later-explained processes (Step S1). More specifically, the maximum value "9" is set as a frame count FC that indicates which picture of the GOP the current frame corresponds to, and 0 degrees is set as a previous correction value ZH that is an angle used for frame images in the previous correction process. The value includes a positive/negative sign.

Thereafter, every time the frame image capture timing arrives at a predetermined frame rate (e.g., 60 fps) (YES in Step S2), a frame image equivalent to one frame of the YUV data is captured from the image processing unit 8 (Step S3), and the frame count FC is incremented at this timing (Step S4).

At the beginning of the recording process, the frame count FC after the increment becomes "10" (YES in Step S5), and therefore the frame count FC is immediately changed to "1" to indicate a frame for capturing the GOP leading picture (hereinafter, referred to as the GOP leading frame) (Step S6). Then, the following process is executed.

Figure 5:
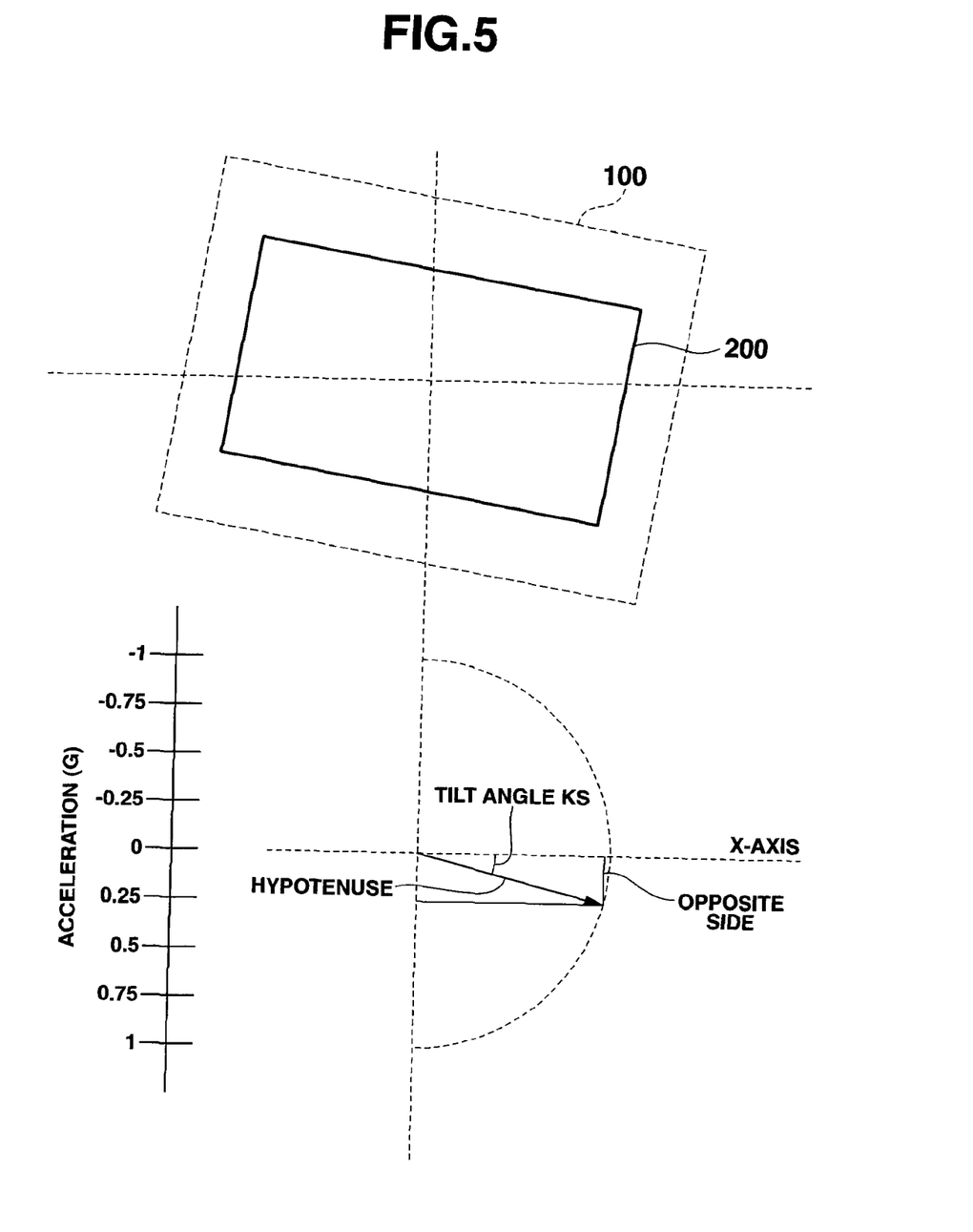
FIG. 5 is a diagram showing the tilt angle obtaining method and the relationship between a frame image and a recording image.

First, the tilt angle KS of the camera main body is calculated on the basis of the acceleration due to gravity detected by the tilt sensor 12 at this timing (Step S7). The tilt angle KS can be found by a calculation using an inverse trigonometric function, based on the ratio of the hypotenuse to the opposite side of a triangle one side of which is the acceleration due to gravity of the horizontal direction, as illustrated in FIG. 5. For example, when the detection result obtained by the tilt sensor 12 is 0.25 G, the tilt angle KS (degrees) can be obtained from the following equation:

Tilt angle $KS=\arcsin(0.25)=14.48$

The rectangle indicated by a broken line in FIG. 5 shows an example of a frame image 100 captured in Step S3 and the tilting of the frame image 100 with respect to the horizontal direction. When the detection result obtained by the tilt sensor 12 is 0.25 G, the tilting as illustrated in this drawing appears in the frame image 100.

Thereafter, the CPU 4 determines a correction value HK that indicates the rotational direction and the rotational amount to use in the tilt correction of the horizontal direction of the frame image, by following the procedure discussed below. First, when the absolute value of the tilt angle KS is smaller than 1 degree, which is the aforementioned minimum correction angle, or in other words, when the tilt angle KS is in a range greater than −1 degree and smaller than +1 degree, and when the tilt amount of the camera main body is too small (YES in Step S8), 0 degree is set to the correction value HK (Step S9).

Figure 6A:
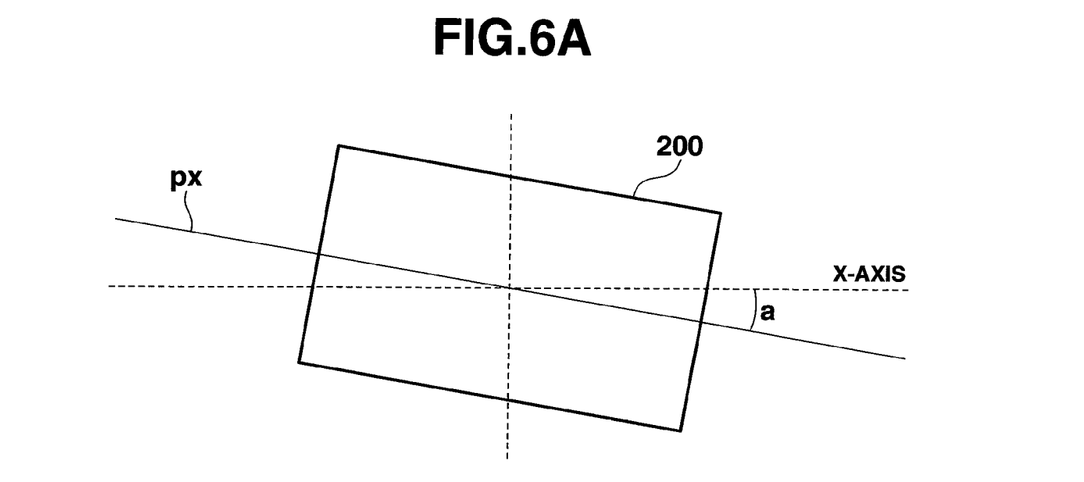
FIGS. 6A and 6B show examples of fundamental correction values that are used in the horizontal direction tilt correction in a recording image.
Figure 6B:
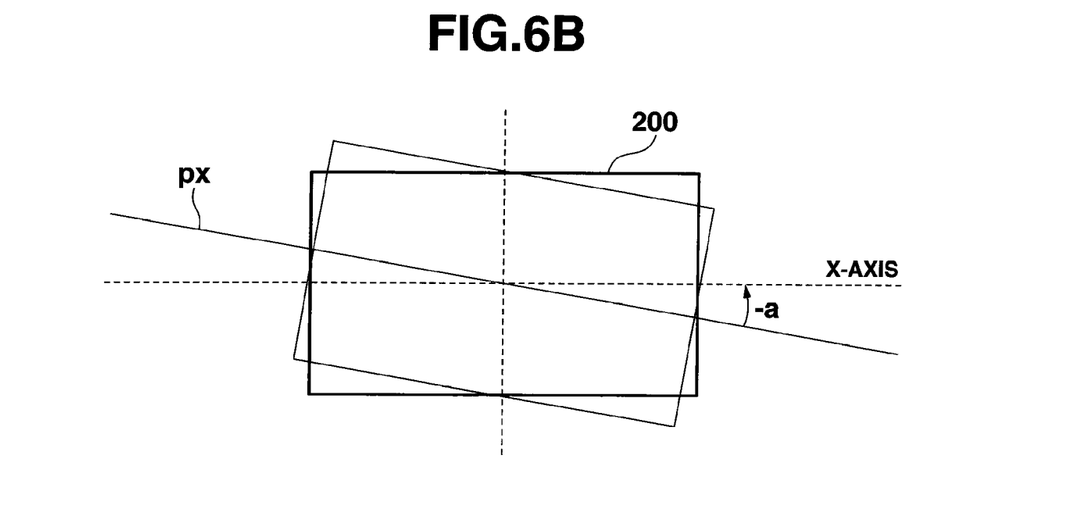

On the other hand, when the absolute value of the tilt angle KS is 1 degree or greater (NO in Step S8), first, an angle value obtained by reversing the positive/negative sign of the tilt angle KS, or in other words the angle value indicating the rotational direction and rotational amount necessary for bringing the inclination of the horizontal direction of the frame image to zero, is set as a correction value HK (Step S10). For example, when the horizontal axis px of a frame image 200 that is recorded is tilted with respect to the actual horizontal direction (x-axis), forming a tilt angle of "a", as illustrated in FIG. 6A, the angle "−a" that is necessary to bring this horizontal axis px onto the actual horizontal direction (x-axis), as illustrated in FIG. 6B, is set as a correction value HK.

Thereafter, whether the difference between the set correction value HK and the previous correction value ZH exceeds the maximum change amount of 4 degrees is determined (Step S11). Because the previous correction value ZH is 0 degree for the frames at the beginning of the recording process, the difference is the absolute value of the correction value HK.

When the difference between the correction value HK and the previous correction value ZH exceeds 4 degrees (YES in Step S11), the correction value HK is adjusted so that the difference is brought down to 4 degrees (Step S12). In such processing, when the correction value HK is positive, the previous correction value ZH to which 4 degrees is added is set as a new correction value HK. When the correction value HK is negative, the previous correction value ZH from which 4 degrees is subtracted is set as a new correction value HK.

Furthermore, whether the absolute value of the unadjusted correction value HK, or the adjusted correction value HK exceeds the maximum correction amount of 8 degrees is determined, or in other words whether the correction value HK is smaller than −8 degrees and larger than +8 degrees is determined. When the absolute value of the correction value HK exceeds 8 degrees (YES in Step S13), the absolute value of the correction value HK is changed to 8 degrees (Step S14). That is, when the correction value HK is positive, the correction value HK is changed to +8 degrees, and when the correction value HK is negative, the correction value HK is changed to −8 degrees.

Next, the CPU 4 cuts a predetermined storing pixel region as a recording image from the frame image captured in Step S3 (Step S15). The storing pixel region may be the region 200 indicated in the solid line illustrated in FIG. 5, and has a predetermined number of pixels and aspect ratio and also the same center as that of the frame image 100 (effective pixel range). FIG. 5 shows an example of the frame image 100 having an aspect ratio of 4:3 and the storing pixel region 200 having an aspect ratio of 16:9.

Thereafter, the CPU 4 performs a rotational process on the cutout recording image 200 in accordance with the correction value HK set in the process of Step S9, S12 or S14, and stores the corrected image in the memory 11 (Step S16). More specifically, a correction is made to the recording image by rotating it in a direction indicated by the correction value HK that is set in any one of the aforementioned processes of Steps S9, S12 and S14 for a rotational amount indicated by the correction value HK, and then the image is sent to the CODEC 9, where it is coded as an I picture, and stored in the memory 11.

Then, the CPU 4 stores the correction value HK that is used for this frame as a new previous correction value ZH (Step S17), and returns to Step S2. When the timing of capturing the next frame image arrives (YES in Step S2), the CPU 4 captures the new frame image from the image processing unit 8 (Step S3), and increments the frame count FC at the same time (Step S4).

Until the frame count FC once again reaches "10", or in other words in the frames corresponding to the image-capturing timings of the second to ninth pictures of the GOP (NO in Step S5), the CPU 4 immediately returns to the aforementioned process of Step S15, where a recording image 200 is cut out. A rotational process is performed on this image 200 by using the same correction value HK as that of the leading frame of the GOP, and the corrected image is stored in the memory 11 (Step S16).

Furthermore, when the frame count FC once again reaches "10" during the above process being repeated, or in other words when the frame image of the leading frame of the next GOP is captured, the frame count FC is returned to "1" (Step S6). Then, a new correction value HK is acquired through the aforementioned processes of Steps S7 to S14, a recording image 200 is cut out of the frame image, the rotational process is performed on this image 200 by using the new correction value HK, and the corrected image is stored into the memory 11 (Steps S15 and S16). Thereafter, the previous correction value ZH is updated to a new correction value HK (Step S17).

Then, the process returns to Step S2. The above processes are repeated until a recording stop instruction is received, such as the shutter button being pressed next time.

Figure 3C:
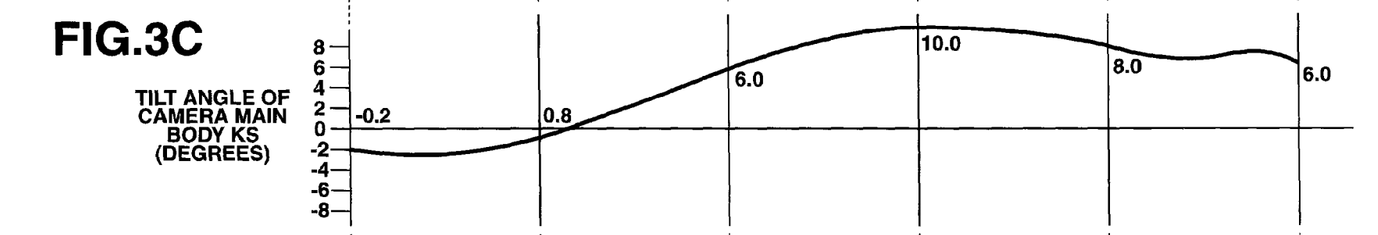
Figure 3D:
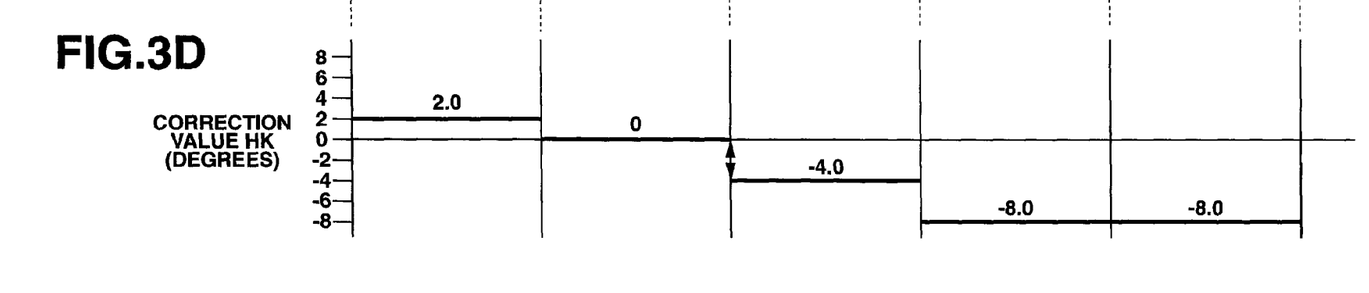

FIGS. 3C and 3D indicate an example of a change in the tilt angle KS of the camera main body and a change in the above correction value HK during the above recording process. As illustrated here, the tilt angle KS of the camera main body constantly changes during the recording, but the correction value HK is set in accordance with the tilt angle detected at frame timings A to E which correspond to the leading frames of GOPs that appear in predetermined intervals as described above. Thus, the correction value HK changes stepwise during the recording. The correction value HK is used in the rotational process for all the frame images (I pictures, P pictures and B pictures) of the same GOP.

Then, in the illustrated example, the correction value HK that is used for the second GOP having its leading frame at the frame timing B is set to 0 degree because the tilt angle of the camera main body in the leading frame is smaller than 1 degree. In addition, the correction value HK used for the third GOP having its leading frame at the frame timing C is set to −4 degrees because the tilt angle of the camera main body in the frame timing C is 6 degrees but the change amount with respect to the previous correction value HK is limited to the aforementioned maximum change amount. Furthermore, the correction value HK used for the fourth GOP having its leading frame at the frame timing D is set to −8 degrees because the tilt angle of the camera main body in the frame timing D is 10 degrees but the correction amount is limited to the aforementioned maximum correction amount.

Figure 4A:
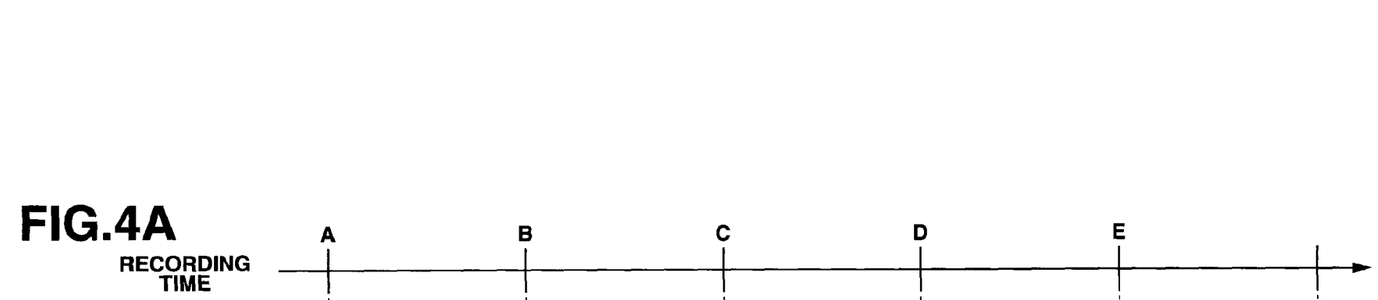
FIGS. 4A, 4B, and 4C show timing charts depicting the relationship of a change in the tilt angle of the camera main body and a change in the tilt angle of recording images.
Figure 4B:
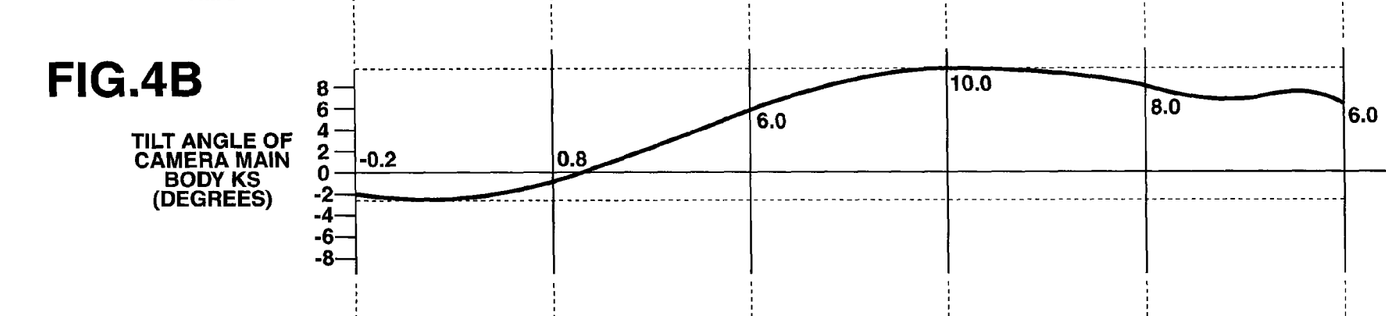
Figure 4C:
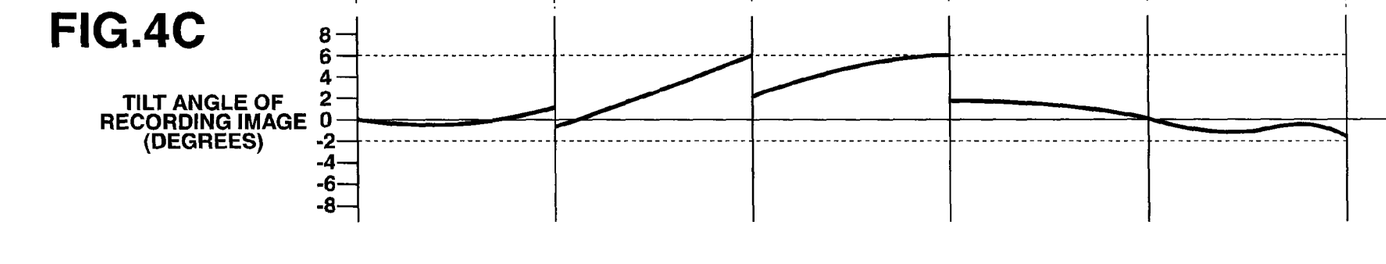

FIGS. 4A, 4B and 4C correspond to FIGS. 3A, 3C and 3D, showing the relationship between the change of the tilt angle KS of the camera main body and the change of the tilt angle of a recording image (image cut out of a frame image) when the correction value HK is set in the above manner.

As explained above, according to the present embodiment, the tilt angle KS of the camera main body is detected at the leading frame of each GOP, and the rotational process with the same rotational direction and the same rotational amount is performed onto all the frame images of each GOP by using the correction value HK (correction angle) set in accordance with the detection results.

Therefore, during a regular image-capturing state except for the time when the tilt angle KS of the camera main body rapidly changes, or in other words when the tilt angle KS of the camera main body drastically changes within the period of time equivalent to one GOP cycle, the change width (runout width) of the horizontal direction of each frame image (recording image) included in the video image, which occurs in accordance with the wobbling of the camera main body, can be reduced.

In this manner, viewability at the replay time, or in other words the quality of the video image can be improved. At the same time, the change (runout) of the horizontal direction that occurs in accordance with the wobbling of the camera main body is maintained to some extent so that the atmosphere, or the realism, of the occasion at the time of image-capturing including the movement of the operator can be carried into the recording video image. As a result, video images that the user may desire at a party among close friends or the like can be readily acquired.

Moreover, the load of the data processing can be reduced during the video image recording, in comparison with a technology with which the detection of the tilt angle KS of the camera main body and the calculation of the correction value HK (correction angle) in correspondence with the detected tilt angle are conducted frame by frame. More specifically, unlike the present embodiment, with a structure in which frame images in a video image are compressed and coded on the basis of a certain program by the CPU 4, or by software encoding, the processing load of the CPU 4 can be reduced during the video recording. Thus, the CPU 4 does not have to be given an unnecessarily high data processing capacity, which reduces the cost of the digital camera 1.

Furthermore, according to the present embodiment, the change in the rotational amount of the recording image between two adjacent GOPs (change amount of the correction value HK) is controlled to be within a predetermined maximum change amount. Thus, when the tilt state of the camera main body drastically changes except when the change occurs in a short period of time, the tilt of the horizontal direction of each frame image can be smoothly changed to follow this change. This also maintains the realism of the occasion, and improves the quality of the video image.

In addition, by limiting the rotational amount executed at one operation of the rotational process for a recording image to a predetermined maximum correction amount, the tilting of the horizontal direction of each of the frame images can be corrected smoothly in accordance with a largely changed tilting state of the camera main body except when the change is made in a short period of time.

According to the present embodiment, the structure of recording a video image in MPEG format is designed in such a manner that the tilt angle of the camera main body is detected by using each GOP of the video image as a unit and that all the frame images of the video image are subjected to the same rotational process by using each GOP as a unit. However, the present invention is equally applicable to video recording in other formats than the aforementioned MPEG. For example, the invention can be applied to video recording in motion-JPEG format in which a series of still image data files are stored altogether as an Audio Video Interleave (AVI) file, and other video recording formats. In such a situation, the tilt angle of the camera main body should be detected in units of the predetermined number of frames, and the predetermined number of frame images should be subjected to the same rotational process.

In a structure of recording a video picture in MPEG format in the same manner as the present embodiment, the tilt angle of the camera main body may be detected by using not only a GOP but also a predetermined number of frames as a unit, and the same rotational process may be executed on the predetermined number of frame images. It should be noted, however, that the video picture can be most effectively recorded if the tilt angle of the camera main body is detected for each GOP and all the frame images included in each GOP of the video picture are subjected to the same rotational process, as in the present embodiment.

More specifically, the degree of tilting of the horizontal direction of the rotationally processed frame image at the time of changing the correction value HK with respect to the previous frame image is larger than the degree of tilting with respect to the subsequent frame image. This lowers the correlation with the previous frame image. However, because the leading picture of the GOP is an I picture, which is subjected to coding (intra-coding) based on the information of the frame only, without incorporating inter-frame prediction, the amount of data is not increased after coding although the correlation with the previous frame image is low. As a result, the GOP-based process according to the present embodiment can effectively compress video pictures.

The same procedure is followed when the process is performed by using, for example, multiple GOPs as a unit. If an I picture is included at a position other than the leading frame in a GOP, multiple frames corresponding to the cycle in which an I picture appears are used as one unit to perform the same process. Still further, when multiple frames between the leading frame and the other frame in which another I picture appears in the same GOP are used as one unit, the same process is performed.

The aforementioned tilt sensor 12 is not limited to an acceleration sensor of the present embodiment, and may be any sensor that directly or indirectly obtains the tilt angle and tilt direction of the camera main body with respect to the horizontal direction (rotational angle around the image-capturing optical axis). In addition, a sensor that can obtain the tilt angle and tilt direction of at least the field of view with respect to the horizontal direction during video capturing instead of the lilting of the camera main body may be adopted.

Furthermore, the tilt sensor 12 or the like may be omitted, and, for example, the CPU 4 may be configured to execute certain image processing such as edge detection and straight-line detection to calculate the tilt angle and tilt direction of the field of view with respect to the horizontal direction by comparing the previous image and the current image.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An image recording device, comprising:
   an obtaining module configured to obtain tilt information during a video image capturing time, the tilt information indicating a tilt direction and a tilt angle of an image with respect to a horizontal direction for a processing unit including a plurality of frames, wherein the tilt information is obtained for one frame of the plurality of frames of the processing unit;
   a rotational processing module configured to perform, in accordance with the tilt direction and the tilt angle indicated by the tilt information obtained for said one frame, a rotational process having a same rotational direction and a same rotational amount for correction of tilting with respect to images of the plurality of frames of the processing unit; and
   a storing module configured to store the images of the frames subjected to the rotational process.

2. The device according to claim 1, wherein the obtaining module is configured to obtain the tilt information at a timing corresponding to a leading frame of the processing unit.

3. The device according to claim 1, further comprising a coding module configured to perform a coding process onto the images of the frames subjected to the rotational process by the rotational processing module, the coding process comprising an inter-frame prediction coding, wherein:
   the storing module is configured to store a video image comprising images of the frames coded by the coding module, the images of the coded frames comprising an inter-frame prediction coded image coded with reference to another frame as a target image by the inter-frame prediction coding and an intra-frame coded image coded without reference to another frame by intra-frame coding; and
   the obtaining module is configured to obtain the tilt information at an acquisition timing of an image of a frame to be coded as the intra-frame coded image by the coding module.

4. The device according to claim 3, wherein:
   the coding process of the coding module comprises an MPEG coding process; and the obtaining module is configured to obtain the tilt information for a group of pictures (GOP) as the processing unit.

5. The device according to claim 1, further comprising a change amount limiting module configured to limit a maximum change amount of the rotational amount between any two sequential processing units in the rotational process, which is performed with respect to each of the images of the frames in the processing unit by the rotational processing module, to a predetermined allowable change amount.

6. The device according to claim 1, further comprising a maximum correction amount limiting module configured to limit the rotational amount in the rotational process, which is performed with respect to each of the images of the frames in the processing unit by the rotational processing module, to a predetermined maximum amount.

7. The device according to claim 1, further comprising a rotation termination module configured to terminate the rotational process, when the tilt angle indicated by the tilt information is smaller than a minimum correction angle.

8. The device according to claim 1, wherein the obtaining module obtains the tilt information for said one frame by obtaining the tilt information at a timing of capturing an image for said one frame.

9. An image tilt correcting method comprising:
  obtaining tilt information during a video image capturing time, the tilt information indicating a tilt direction and a tilt angle of an image with respect to a horizontal direction for a processing unit including a plurality of frames, wherein the tilt information is obtained for one frame of the plurality of frames of the processing unit;
  performing, in accordance with the tilt direction and the tilt angle indicated by the tilt information obtained for said one frame, a rotational process having a same rotational direction and a same rotational amount for correction of tilting with respect to images of the plurality of frames of the processing unit; and
  storing the images of the frames subjected to the rotational process.

10. The method according to claim 9, wherein the tilt information is obtained for said one frame by obtaining the tilt information at a timing of capturing an image for said one frame.

11. A non-transitory computer readable recording medium having stored thereon a computer program which is executable by a computer, the computer program controlling the computer to execute functions comprising:
  obtaining tilt information during a video image capturing time, the tilt information indicating a tilt direction and a tilt angle of an image with respect to a horizontal direction for a processing unit including a plurality of frames, wherein the tilt information is obtained for one frame of the plurality of frames of the processing unit;
  performing, in accordance with the tilt direction and the tilt angle indicated by the tilt information obtained for said one frame, a rotational process having a same rotational direction and a same rotational amount for correction of tilting with respect to images of the plurality of frames of the processing unit; and
  storing the images of the frames subjected to the rotational process.

12. The non-transitory computer readable recording medium according to claim 11, wherein the tilt information is obtained for said one frame by obtaining the tilt information at a timing of capturing an image for said one frame.

* * * * *